United States Patent [19]

Poggio

[11] 4,325,558

[45] Apr. 20, 1982

[54] ASSEMBLY CONSISTING OF A SEAL GASKET FOR VALVE STEMS AND A SPRING SUPPORT CAP

[75] Inventor: Mario Poggio, Leini, Italy

[73] Assignee: SAIAG S.p.A., Cirie, Italy

[21] Appl. No.: 138,844

[22] Filed: Apr. 10, 1980

[30] Foreign Application Priority Data

May 7, 1979 [IT] Italy ................................ 67950 A/79

[51] Int. Cl.³ ............................................. F16J 15/00
[52] U.S. Cl. ................................ 277/189; 123/188 P; 251/214
[58] Field of Search ............... 251/214, 321; 277/208, 277/166, 189; 123/188 P

[56] References Cited

U.S. PATENT DOCUMENTS 3,480,286 11/1969 Kosatka ................................ 277/208
3,993,284 11/1976 Lukens ................................ 251/214
4,135,546 1/1979 Morrison ............................ 251/214

*Primary Examiner*—Robert I. Smith
*Attorney, Agent, or Firm*—Young & Thompson

[57] ABSTRACT

In an internal combustion engine having an assembly consisting of a seal gasket for the valve stem and a spring support cap, the gasket is mounted on the valve guide to form a seal against the valve stem and the spring support cap is mounted externally of the gasket and has an outwardly-extending flange that rests directly on the engine cylinder head. The lower end of the gasket has an outwardly extending flange for retention by the support cap, the latter having a stepped cross section to enable it to be centered on the exterior surfaces of the gasket with an interference fit. The valve spring bears on the flange of the support cap.

5 Claims, 1 Drawing Figure

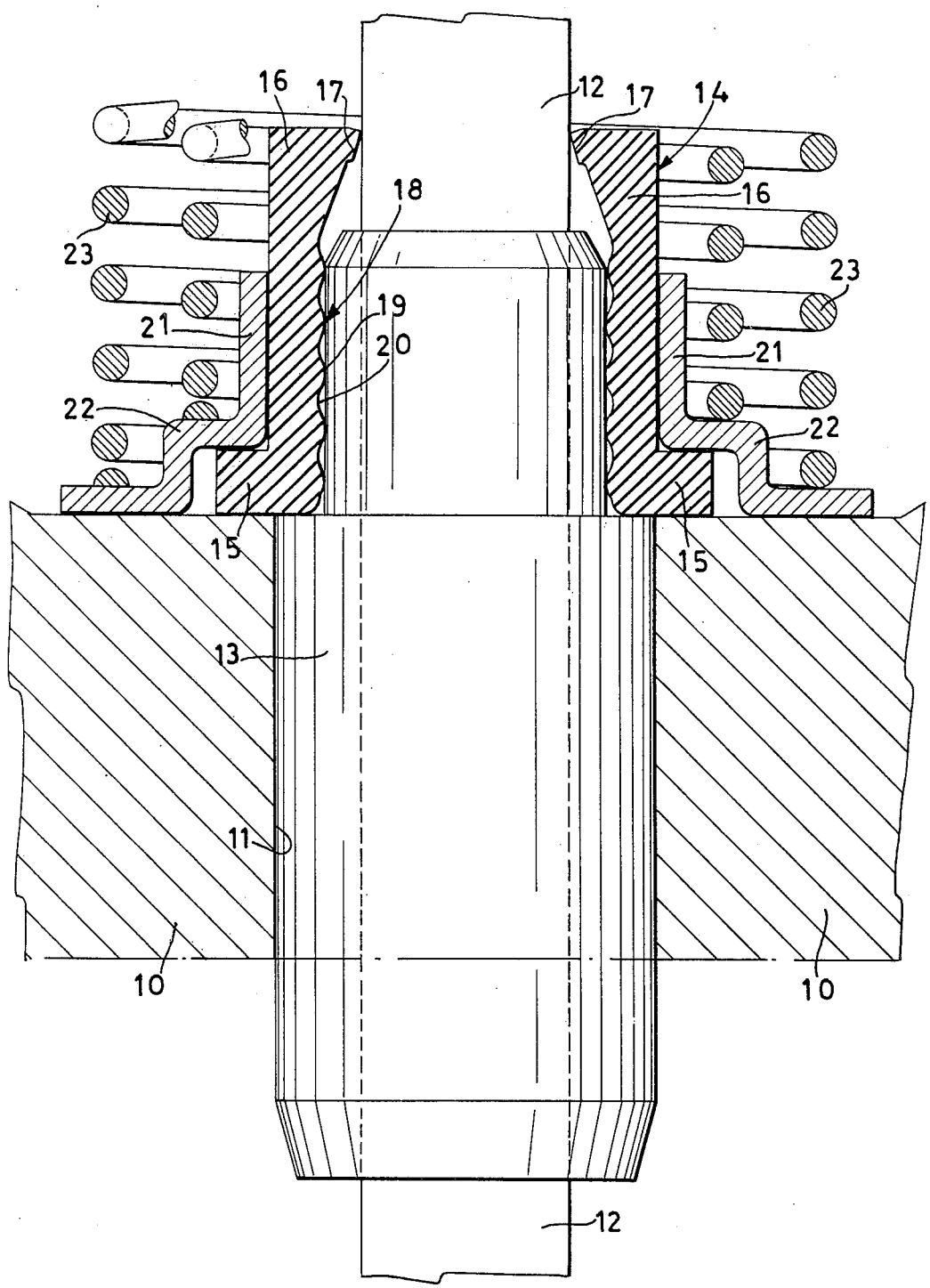

ASSEMBLY CONSISTING OF A SEAL GASKET FOR VALVE STEMS AND A SPRING SUPPORT CAP

This invention relates to an assembly consisting of a seal gasket for valve stems and a spring support cap.

In internal combustion engines, gaskets must be provided in order to form an oil seal against the valve stems.

At the same time, washers must be provided around the stems and resting on the cylinder block, in order to form a centering support for the valve springs.

The main object of the invention is to provide an assembly which is a combination of these two essential elements, i.e. a gasket which is centred on the valve stem by a cap mounted on it, with the gasket providing its own centering, and also restraining the cap so as to prevent it from chattering and vibrating noisily during engine operation.

A further object of the invention is to provide a seal gasket which is of such a composition as not to require either the conventional steel spring or the metal stiffening insert which are normally used in this type of gasket.

The cap according to the invention is of such a type as to retain the gasket in its correct position, so preventing it from escaping from the valve guide.

These and further objects, which will be more apparent hereinafter, are attained according to the invention by an assembly consisting of a seal gasket for valve stems and a spring support cap, of the type comprising a gasket mounted on the valve guide to form a seal against the valve stem, and a spring support cap mounted externally to the gasket and resting on the engine cylinder head, wherein the edges of the gasket are flanged outwards for their retention by the cap, this latter having its lateral edges bent to enable it to be centred on the outer walls of the gasket by means of an interference fit.

The preferred embodiment of the assembly according to the invention is described by way of non-limiting example hereinafter with reference to the accompanying drawing, which shows an axial section through an assembly consisting of a seal gasket and cap according to the invention, fitted to an engine valve stem.

In known manner, the cylinder head 10 comprises bores 11 in which the valve stem 12 slides (the valve is not shown in its entirety, as its head and seat are of the normal type). A retaining slide guide 13 for the stem 12 is pressed into the bore 11.

A gasket 14 is positioned on the outside of the cylinder head 10 in order to form a perfect oil seal against the stem 12.

According to the invention, this gasket is entirely of rubber, and is of substantially cylindrical configuration with its lower edge 15 flanged outwards to directly rest on the cylinder head 10.

The upper edge 16 has a cross-section which increases towards the end, in order to form thereat a lip 17 for sealing against the valve stem 12.

The inner surface 18 of the gasket 14, which forms a seal against the outer surface of the guide 13, has an undulated configuration. More precisely, this surface is in the form of concentric annular ribs or bands 19 having a diameter slightly less than the outer diameter of the guide 13, and alternating with annular bands 20 having a diameter slightly greater than the outer diameter of the guide 13.

The gasket 14 is held against the cylinder head 10 by means of a support cap 21 for the valve return spring or springs 23. In this respect, the cap 21 has a stepped cross-section 22 in order to retain the gasket 14 at its lower edge 15 both laterally and axially.

The assembly constructed in this manner operates as follows.

When the gasket 14 has been mounted in position, it forms a seal against the stem 12 by means of its lip 17. The concentric bands 19 provide proper centering of the gasket on the valve guide 13. At the same time, these bands or ribs act as pressure zones 19 alternating with free zones 20, to facilitate sealing without increasing the heat of friction.

As stated, the gasket 14 has a great constructional advantage in that it requires neither a steel spring nor a stiffening ring, as its chemical composition gives it the rigidity and elasticity characteristics necessary for this application.

A composition suitable for this gasket is advantageously as follows:

|  | QUANTITY |
|---|---|
| ELASTOMER | |
| Acrylic ethylene copolymer | 350–480 |
| Acrylic butadiene nitrile copolymer | 40–60 |
| FILLERS | |
| Silicic acid | 60–80 |
| Aluminium and magnesium silicate | 340–460 |
| Polymer plasticiser | 15–25 |
| ADDITIVES | |
| Chromium oxide | 5–10 |
| Stearic acid | 10–15 |
| 2,5-dimethyl-2,5-(1-butylperoxy)-hexane | 10–15 |
| 4,4-butylidene-bis-(6-tert.butyl-m-cresol) | 5–15 |

As can be seen, the cap 21 comprises substantially two concentric bases of different areas, separated by a step 22.

A spring 23 rests on each base. The cap could obviously have more bases and thus more steps, in which case the springs 23 would be more than two in number.

However, the basic characteristics of this cap are its lower annular compartment which houses and retains the lower edge 15 of the gasket 14, and its raised edge 21 which abuts against the outer lateral walls of the gasket.

This thus provides a homogeneous assembly in which the cap retains the gasket in its seat, so preventing it from withdrawing in an upward direction, while at the same time the gasket retains the cap on the base 10 so preventing any annoying chattering typical of present-day caps due to the elasticity of the springs.

The assembly according to the invention has been illustrated with reference to a preferred embodiment, but modifications can be made thereto both in terms of shape and structure, without leaving the scope of the inventive idea, as protected by the following claims.

What we claim is:

1. In combination with the cylinder head of an internal combustion engine having a valve and valve guide extending through the head and a coil compression spring acting between the valve and the cylinder head, a gasket surrounding the valve guide and sealing against the valve stem, the gasket having a radially outwardly extending flange on its end adjacent the cylinder head, and a spring support cap surrounding the gasket and having an interference fit with the gasket and resting on the cylinder head, the valve spring pressing the support cap against the cylinder head, the support cap having an annular recess in which said gasket flange is disposed.

2. An assembly as claimed in claim 1, said support cap having a radially outwardly extending annular flange that rests on the engine cylinder head, said spring acting between the valve and said support cap flange.

3. An assembly as claimed in claim 1, wherein the cap comprises more than one spring support base, these bases being of different diameters and each being separated from its adjacent base by a step.

4. An assembly as claimed in claim 1, wherein the bent lateral edges of the gasket are retained against the cylinder head by the cap which rests on them.

5. An assembly as claimed in claim 1, wherein the gasket is constituted only by a material having the following composition:

|  | QUANTITY |
|---|---|
| ELASTOMER | |
| Acrylic ethylene copolymer | 350–480 |
| Acrylic butadiene nitrile copolymer | 40–60 |
| FILLERS | |
| Silicic acid | 60–80 |
| Aluminium and magnesium silicate | 340–460 |
| Polymer plasticiser | 15–25 |
| ADDITIVES | |
| Chromium oxide | 5–10 |
| Stearic acid | 10–15 |
| 2,5-dimethyl-2,5-(1-butylperoxy)-hexane | 10–15 |
| 4,4-butylidene-bis-(6-tert.butyl-m-cresol) | 5–15 |

* * * * *